(12) United States Patent
Chern et al.

(10) Patent No.: US 10,142,539 B2
(45) Date of Patent: Nov. 27, 2018

(54) OPTICAL APPARATUS WITH WIDE-ANGLE OR PANORAMIC IMAGING FUNCTION

(71) Applicant: EVERREADY PRECISION IND. CORP., Kaohsiung (TW)

(72) Inventors: Jyh-Long Chern, Taipei (TW); Chih-Ming Yen, New Taipei (TW)

(73) Assignee: EVERREADY PRECISION IND. CORP., Kaohsiung (TW)

( * ) Notice: Subject to any disclaimer, the term of this patent is extended or adjusted under 35 U.S.C. 154(b) by 0 days.

(21) Appl. No.: 15/207,227

(22) Filed: Jul. 11, 2016

(65) Prior Publication Data
US 2017/0041536 A1 Feb. 9, 2017

Related U.S. Application Data

(60) Provisional application No. 62/202,331, filed on Aug. 7, 2015.

(30) Foreign Application Priority Data

Oct. 23, 2015 (TW) .............................. 104217048 U

(51) Int. Cl.
*H04N 5/225* (2006.01)
*H04N 5/232* (2006.01)
(Continued)

(52) U.S. Cl.
CPC ..... *H04N 5/23238* (2013.01); *G02B 13/0065* (2013.01); *G02B 13/06* (2013.01); *H04N 5/2254* (2013.01); *H04N 5/2257* (2013.01); *H04N 5/2258* (2013.01); *H04N 9/3176* (2013.01); *H04N 5/2252* (2013.01)

(58) Field of Classification Search
CPC ............. H04N 5/23238; H04N 5/2258; H04N 5/2257; H04N 9/3176; H04N 5/2254; H04N 5/2252; G02B 13/06; G02B 13/0065
See application file for complete search history.

(56) References Cited

U.S. PATENT DOCUMENTS 5,940,126 A * 8/1999 Kimura ................ H04N 3/1593
348/218.1
6,177,950 B1 * 1/2001 Robb ................ H04M 1/72522
348/14.01
(Continued)

*Primary Examiner* — Hung H Lam
(74) *Attorney, Agent, or Firm* — Muncy, Geissler, Olds & Lowe, P.C.

(57) ABSTRACT

An optical apparatus includes a camera casing, a first optical module and a second optical module. The first optical module and the second optical module are installed on the camera casing. The first optical module receives an ambient light to capture a first image. The second optical module receives the ambient light to capture a second image, or the second optical module senses the ambient light. At least one of the first optical module and the second optical module has a non-linear optical axis in order to replace the front camera module and the rear camera module of the conventional panoramic camera. The optical apparatus is additionally installed on a periphery region of a portable electronic device or an extension position extended from the periphery region. Consequently, the optical apparatus provides a sufficient space to accommodate the first optical module and the second optical module.

13 Claims, 8 Drawing Sheets

(51) Int. Cl.
 G02B 13/00 (2006.01)
 G02B 13/06 (2006.01)
 H04N 9/31 (2006.01)

(56) References Cited

U.S. PATENT DOCUMENTS

| | | | | |
|---|---|---|---|---|
| 6,532,035 | B1* | 3/2003 | Saari | G02B 13/005 |
| | | | | 348/14.01 |
| 7,567,287 | B2* | 7/2009 | Hyatt | G02B 13/0065 |
| | | | | 348/340 |
| 8,953,079 | B2* | 2/2015 | Raju | H04N 5/2624 |
| | | | | 348/14.02 |
| 9,288,471 | B1* | 3/2016 | Yang | H04N 13/0221 |
| 2002/0057344 | A1* | 5/2002 | Miyake | H04N 5/2254 |
| | | | | 348/207.99 |
| 2003/0036365 | A1* | 2/2003 | Kuroda | H04M 1/0214 |
| | | | | 455/575.1 |
| 2006/0014563 | A1* | 1/2006 | Cheng | H04M 1/0254 |
| | | | | 455/557 |
| 2007/0053682 | A1* | 3/2007 | Chang | G03B 17/02 |
| | | | | 396/429 |
| 2010/0066894 | A1* | 3/2010 | Seo | G02B 15/06 |
| | | | | 348/340 |
| 2014/0320603 | A1* | 10/2014 | Pettersson | G01C 15/002 |
| | | | | 348/46 |

* cited by examiner

OPTICAL APPARATUS WITH WIDE-ANGLE OR PANORAMIC IMAGING FUNCTION

CROSS-REFERENCE TO RELATED APPLICATION

This application claims priority to U.S. Provisional Patent Application No. 62/202,331 entitled "LENS MODULE ALLOCATED ON THE EDGE PORTION OF MOBILE PHONE" filed Aug. 7, 2015, the contents of which are incorporated herein by reference.

FIELD OF THE INVENTION

The present invention relates to an optical apparatus, and more particularly to an optical apparatus that is installed on a portable electronic device and has special functions such as a wide-angle imaging function or a panoramic imaging function.

BACKGROUND OF THE INVENTION

Recently, with development of electronic industries and advance of industrial technologies, various electronic devices are designed toward small size, light weightiness and easy portability. Consequently, these electronic devices can be applied to mobile business, entertainment or leisure purposes whenever or wherever the users are. For example, various image capture devices are widely used in many kinds of fields such as smart phones, tablet computers, wearable electronic devices or any other appropriate portable electronic devices. Since the electronic devices are small and portable, users can take the electronic devices to capture images and store the images according to the users' requirements. Furthermore, users can upload the images to the internet through mobile networks in order to transmit data.

The image capture device of the portable electronic device can be used to capture images at any time in order to record the life in pieces. Consequently, most users pay much attention to the image capture device. Moreover, for allowing the image capture devices to be favored by most people, the manufacturers make efforts in increasing the functions of the image capture devices.

Recently, a portable electronic device with the function of capturing panoramic images has been introduced into the market. For example, a RICOH panoramic camera has the function of capturing panoramic images. The panoramic camera has a small size and is easily carried. A front camera module and a rear camera module with the same specification are respectively installed on a front surface and a rear surface of the panoramic camera. The front camera module is used for capturing a 180-degree front image. The rear camera module is used for capturing a 180-degree rear image in the rear side. After the 180-degree front image and the 180-degree rear image are captured, the 180-degree front image and the 180-degree rear image are combined as a 360-degree panoramic image by an image processing module of the panoramic camera. However, this panoramic camera still has some drawbacks. For example, the field of view (FOV) of the front camera module and the field of view (FOV) of the rear camera module should be as wide as possible. As known, the camera module with the wider FOV is not cost-effective and has a bulky volume. Consequently, the camera module with the wider FOV is only applied to the panoramic camera, and is not suitably installed on another portable electronic device (e.g., a smart phone).

Moreover, with increasing development of the portable electronic device, a camera module of the portable electronic device with a panoramic lens is also introduced into the market. The panoramic lens comprises plural lenses in a ring-shaped arrangement. By the panoramic lens, the portable electronic device can capture panoramic images. For example, a GoPano panoramic lens has the function of capturing panoramic images.

Moreover, another panoramic camera with plural lens modules in a ring-shaped arrangement is also introduced into the market. For example, an Olympus panoramic camera is used for capturing plural local images at many angles. After these local images are acquired, these local images are combined as a panoramic image by a built-in image processing module of the panoramic camera. However, since the volume of this panoramic camera is very large, the panoramic camera is not suitably installed on the portable electronic device. The panoramic camera with plural lens modules in a ring-shaped arrangement further includes a Panono spherical panoramic camera or a Squito throwable panoramic camera. The Panono spherical panoramic camera and the Squito throwable panoramic camera are ball-shaped. While the panoramic camera is thrown into the air, plural local images at many angles are captured by the plural lens modules. These local images are combined as a complete panoramic image. The operating principles of the Panono spherical panoramic camera or the Squito throwable panoramic camera are similar to those of the Olympus panoramic camera, and are not redundantly described herein.

Nowadays, some kinds of portable electronic devices such as slim-type mobile phone also have the functions of capturing panoramic images. The smart phone comprises a front camera module and a rear camera module. However, the specifications of the front camera module and the rear camera module are different, and the viewing angles of the front camera module and the rear camera module are smaller than 180 degrees. In other words, the smart phone cannot adopt the operating principle of the RICOH panoramic camera to capture the panoramic images. The smart phone is only able to continuously capture images by using the rear camera module while the smart phone is held by the user's hands and rotated along a horizontal direction. After plural local images are captured, these local images are combined as a complete panoramic image. However, since it is difficult to rotate the mobile phone along the horizontal direction at the constant speed, the local images of the panoramic image usually have different widths.

Therefore, there is a need of allowing an optical apparatus with a panoramic function to be integrated into a portable electronic device in order to overcome the above drawbacks, while in the meantime, more functions may be able to include additionally.

SUMMARY OF THE INVENTION

For solving the drawbacks of the conventional technologies, the present invention provides an optical apparatus with a panoramic function. Meanwhile, the optical apparatus is integrated into a portable electronic device. Consequently, the function of the portable electronic device is enhanced.

In accordance with an aspect of the present invention, there is provided an optical apparatus. The optical apparatus is installed on a periphery region of a portable electronic device or an extension position extended from the periphery region. The optical apparatus includes a camera casing, a first optical module and a second optical module. The camera casing is fixed on the periphery region of the portable electronic device. The first optical module is installed on the camera casing. The first optical module receives an ambient light to capture a first image. The second optical module is installed on the camera casing and arranged beside the first optical module. The second optical module receives the ambient light to capture a second image, or the second optical module senses the ambient light. Moreover, at least one of the first optical module and the second optical module has a non-linear optical axis, i.e., the corresponding optical axis is not in a straight line.

In an embodiment, a first optical axis of the first optical module is not a straight line, i.e., non-linear. The first optical module includes a first optical lens and a first optical sensor. The first optical lens is fixed on the camera casing, and allows the ambient light to pass through. The first optical sensor corresponds to the first optical lens. After the ambient light passing through the first optical lens is received by the first optical sensor, the first image is acquired by the first optical sensor. The first optical lens has a first reflective structure to reflect the ambient light. After the ambient light is reflected by the first reflective structure, the ambient is transmitted to the first optical sensor through the first optical lens.

In an embodiment, the second optical module receives the ambient light to capture the second image, and a second optical axis of the second optical module is non-linear. The second optical module includes a second optical lens and a second optical sensor. The second optical lens is fixed on the camera casing, and allows the ambient light to pass through. The second optical sensor corresponds to the second optical lens. After the ambient light passing through the second optical lens is received by the second optical sensor, the second image is acquired by the second optical sensor. The second optical lens has a second reflective structure to reflect the ambient light, and hence the optical axis is not a straight line. After the ambient light is reflected by the second reflective structure, the ambient is transmitted to the second optical sensor through the second optical lens.

In an embodiment, the optical further includes a control unit, and the control unit is connected with the first optical sensor and the second optical sensor. The first image and the second image are combined as a panoramic image by the control unit.

In an embodiment, the optical apparatus further includes a first time-of-flight measuring device and a second time-of-flight measuring device. The first time-of-flight measuring device is installed on the camera casing and corresponding to the first optical module. The second time-of-flight measuring device is installed on the camera casing, arranged beside first time-of-flight measuring device, and corresponding to the second optical module. A distance of the panoramic image is measured by the first time-of-flight measuring device and the second time-of-flight measuring device collaboratively.

In an embodiment, the camera casing is made of glass material or plastic material, anti-reflective coatings are formed on the first optical lens and the second optical lens where the ambient light passes through, and the first reflective structure and the second reflective structure are high reflective coatings.

In an embodiment, the optical apparatus further includes a third optical module, and the third optical module is arranged between the first optical module and the second optical module. The third optical module receives the ambient light to capture a third image, or the third optical module senses the ambient light. The third optical module includes at least one third optical lens and a third optical sensor. The at least one third optical lens is fixed between the first optical lens and the second optical lens, and allows the ambient light to pass through. The third optical sensor corresponds to the at least one third optical lens. After the ambient light passing through the at least one third optical lens is received by the third optical sensor, the third image is acquired by the third optical sensor. A third optical axis of the third optical module is linear, and the third optical axis is perpendicular to a periphery surface of the periphery region of the portable electronic device.

In an embodiment, the second optical module senses the ambient light. The second optical module includes at least one second optical lens and a second optical sensor. The at least one second optical lens is fixed on the camera casing, and allows the ambient light to pass through. The second optical sensor corresponds to the at least one second optical lens. The ambient light passing through the at least one second optical lens is sensed by the second optical sensor, and a second optical axis of the second optical module is linear.

In an embodiment, the optical apparatus further includes a structured light generation device, and the structured light generation device is installed on the camera casing. The structured light generation device includes at least one light source, an optical element group with a projection pattern, and a conversion lens module. The at least one light source emits plural light beams. After the plural light beams pass through the projection pattern of the optical element group, a structured light is outputted. The conversion lens module is installed on the camera casing. After the plural light beams are collimated and expanded by the conversion lens module, the plural light beams are projected on a projection surface, so that a structured light pattern is formed on the projection surface. Moreover, projecting directions of the plural light beams are perpendicular to a periphery surface of the periphery region of the portable electronic device.

In an embodiment, the optical apparatus further includes an additional structured light generation device, and the additional structured light generation device is installed on the camera casing to form an additional structured light pattern on the projection surface. The structured light pattern and the additional structured light pattern are mixed as a mixed structured light pattern, and the mixed structured light pattern is correspondingly changed in response to a change of the structured light pattern or the additional structured light pattern.

In an embodiment, the optical apparatus further includes a projection device, and the projection device is installed on the camera casing. The projection device includes at least one light source, a display element and an optical lens. The at least one light source emits plural light beams. The display element is arranged beside the at least one light source. After the plural light beams pass through the display element, a displaying image is shown on display element. The optical lens is installed on the camera casing. After the plural light beams from the display element pass through the optical lens, the displaying image is projected on a projection surface. Moreover, projecting directions of the plural light beams are perpendicular to a periphery surface of the periphery region of the portable electronic device.

In an embodiment, the optical apparatus further includes a time-of-flight measuring device, and the time-of-flight measuring device is installed on the camera casing to measure a distance.

In an embodiment, the periphery region is extended externally from a nearby position of a display screen of the portable electronic device, and the optical apparatus is fixed on the periphery region through a mechanical mechanism, an electric mechanism and/or an electromagnetic mechanism.

In an embodiment, the camera casing is rectangular, L-shaped, n-shaped or asymmetric, and at least one of a first surface, a second surface and a third surface of the camera casing is flat or curvy.

In an embodiment, the ambient light contains light beams in a first wavelength range, light beams in a second wavelength range and/or light beams in a thermal band.

From the descriptions, the present invention provides an optical apparatus. The optical apparatus is installed on a periphery region of a portable electronic device. The periphery region is extended externally from a nearby position of a display screen of the portable electronic device. That is, the optical apparatus is additionally installed on the portable electronic device. Consequently, the optical apparatus provides a sufficient space to accommodate a first optical module, a second optical module and a third optical module. If necessary, the optical apparatus is further equipped with a structured light generation device, a time-of-flight measuring device and a projection device. The installation of these components is not restricted by the thickness of the portable electronic device. Consequently, the functions of the optical apparatus of the present invention are enhanced. In some situations, a zoom lens module requiring a larger space is disposed within the optical apparatus. Moreover, two of the first optical module, the second optical module and the third optical module have non-linear optical axes in order to replace the front camera module and the rear camera module of the conventional panoramic camera.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For overcoming the drawbacks of the conventional technologies, the present invention provides an optical apparatus.

Figure 1:
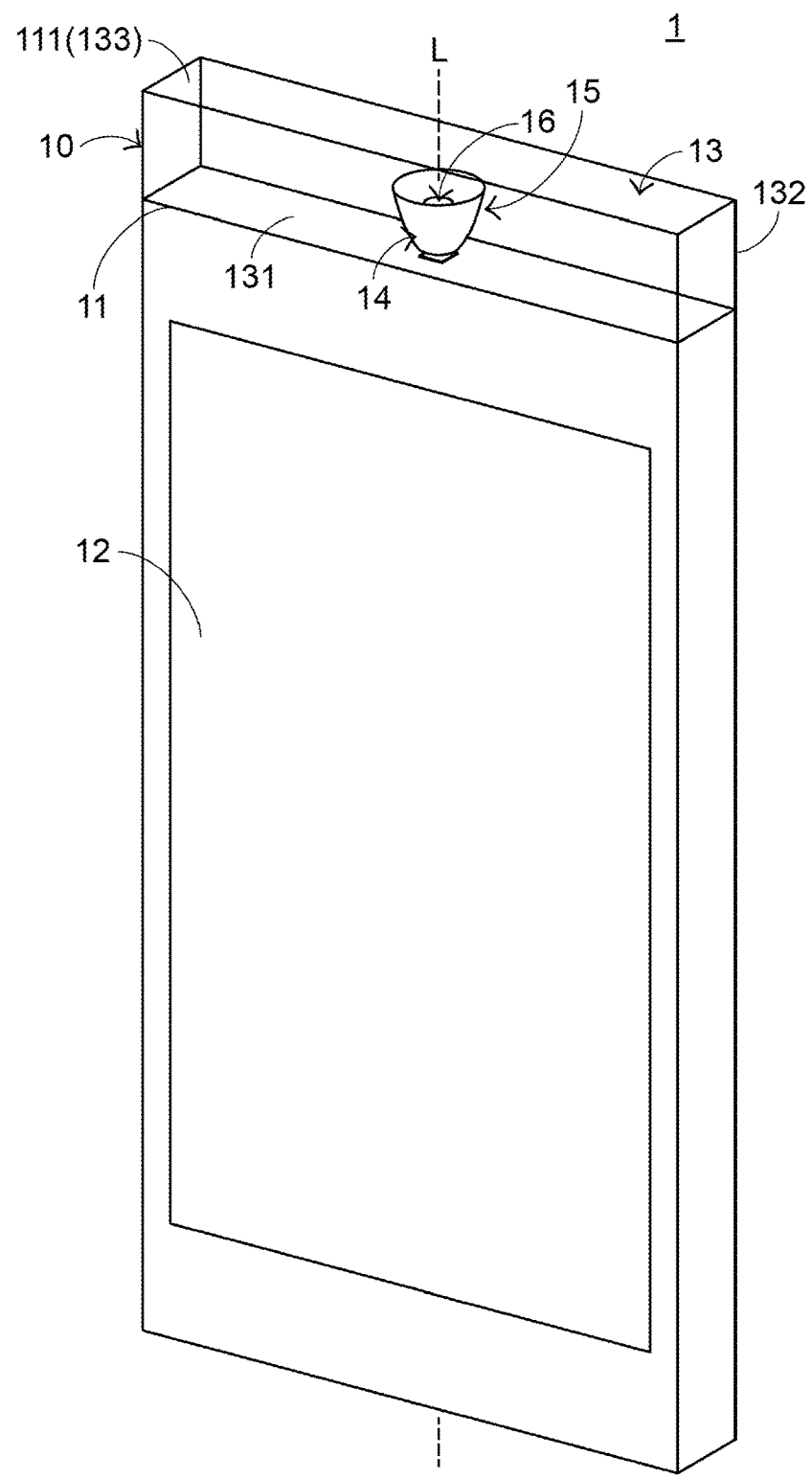
FIG. 1 is a schematic perspective view illustrating an optical apparatus and a portable electronic device according to a first embodiment of the present invention.
Figure 2:
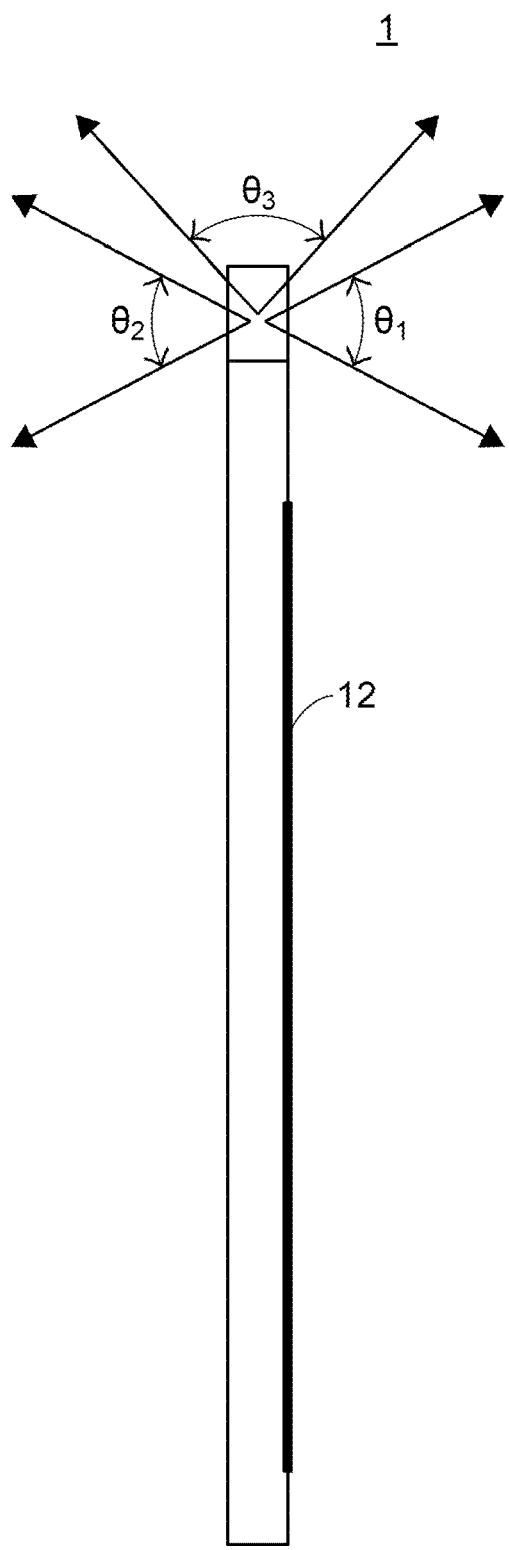
FIG. 2 is a schematic side view illustrating the optical apparatus and the portable electronic device according to the first embodiment of the present invention.
Figure 3:
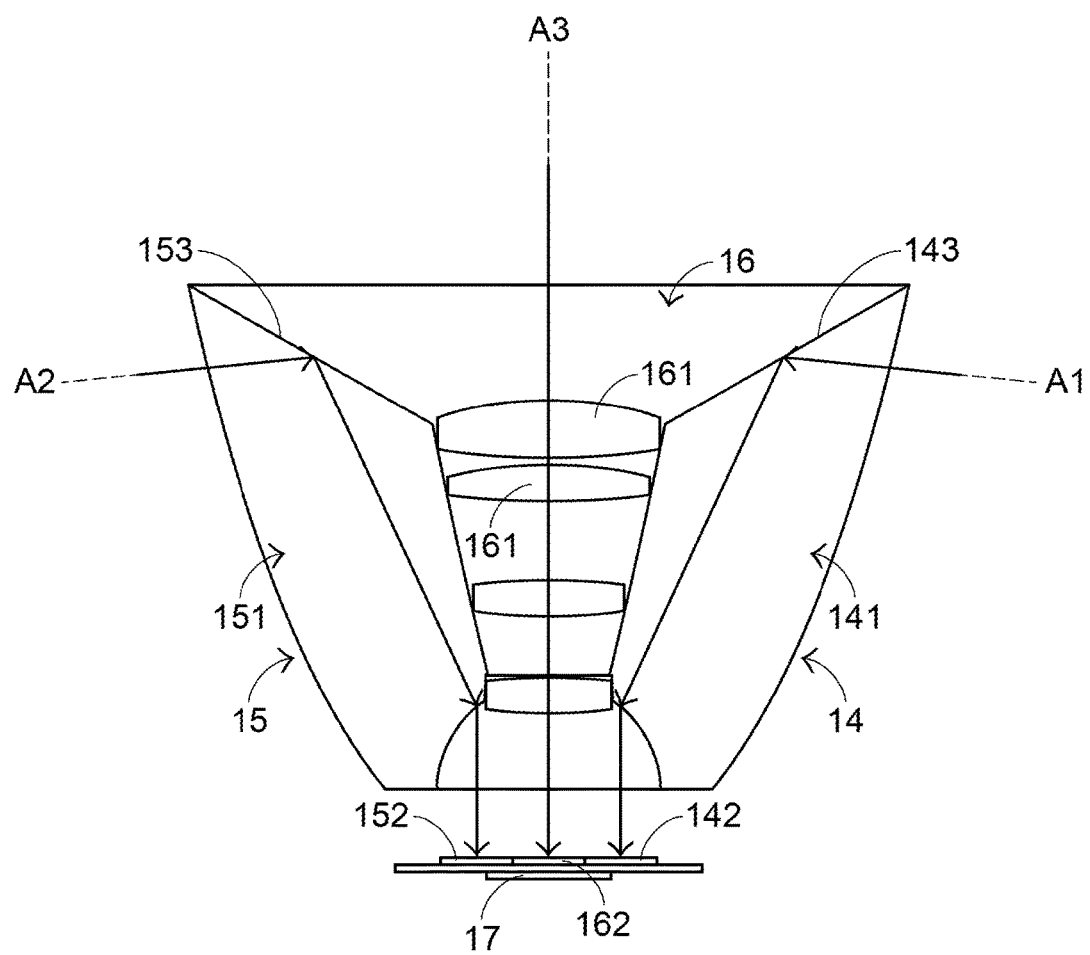
FIG. 3 is a schematic cross-sectional view illustrating the optical apparatus according to the first embodiment of the present invention.

FIG. 1 is a schematic perspective view illustrating an optical apparatus and a portable electronic device according to a first embodiment of the present invention. FIG. 2 is a schematic side view illustrating the optical apparatus and the portable electronic device according to the first embodiment of the present invention. FIG. 3 is a schematic cross-sectional view illustrating the optical apparatus according to the first embodiment of the present invention. Please refer to FIGS. 1, 2 and 3. The optical apparatus 10 is installed on a periphery region 11 of the portable electronic device 1. The periphery region 11 is extended externally from a nearby position of a display screen 12 of the portable electronic device 1. In this embodiment, the optical apparatus 10 comprises a camera casing 13, a first optical module 14, a second optical module 15, a third optical module 16 and a control unit 17. The camera casing 13 is fixed on the periphery region 11 of the portable electronic device 1. The first optical module 14 is installed on the camera casing 13. The first optical module 14 is used for receiving the ambient light and capturing a first image. The second optical module 15 is installed on the camera casing 13 and arranged beside the first optical module 14. The second optical module 15 is used for receiving the ambient light and capturing a second image. The third optical module 16 is arranged between the first optical module 14 and the second optical module 15. The third optical module 16 is used for receiving the ambient light to capture a third image, or the third optical module 16 is used for sensing the ambient light.

An example of the portable electronic device 1 includes but is not limited to a smart phone. The optical apparatus 10 is fixed on the periphery region 11 through a mechanical mechanism, an electric mechanism and/or an electromagnetic mechanism. Preferably, the optical apparatus 10 is integrated into a housing of the portable electronic device 1. Moreover, the camera casing 13 of the optical apparatus 10 is made of glass material or plastic material.

The first optical module 14 comprises a first optical lens 141 and a first optical sensor 142. The first optical lens 141 is fixed on the camera casing 13 for allowing the ambient light to pass through. The first optical sensor 142 corresponds to the first optical lens 141. After the ambient light passing through the first optical lens 141 is received by the first optical sensor 142, the first image is acquired by the first optical sensor 142. Moreover, both of the first optical lens 141 and the first optical sensor 142 are arranged in a first optical axis A1 of the first optical module 14. Moreover, a curvy surface of the first optical lens 141 far from the first optical sensor 142 has a first reflective structure 143 to reflect the ambient light. By the first reflective structure 143, the ambient light introduced into the first optical lens 141 is reflected to the first optical sensor 142. In an embodiment, the first reflective structure 143 is a high reflective coating on the curvy surface of the first optical lens 141.

Please refer to FIGS. 1, 2 and 3 again. The first optical lens 141 and the first optical sensor 142 are arranged along a long axis L of the portable electronic device 1. Due to the arrangement of the first reflective structure 143, the orientation of a first viewing angle θ1 of the first optical module 14 is the same as the orientation of the display screen 12 of the portable electronic device 1. That is, the first optical axis A1 of the first optical module 14 is non-linear, i.e., the first optical axis A1 is not in a straight line. Preferably, an anti-reflective coating is formed on the surface of the first optical lens 141 where the ambient light passes through. Consequently, the ability of the ambient light to pass through the first optical lens 141 is enhanced.

The second optical module 15 comprises a second optical lens 151 and a second optical sensor 152. The second optical lens 151 is fixed on the camera casing 13 and connected with the first optical lens 141 for allowing the ambient light to pass through. The second optical sensor 152 corresponds to the second optical lens 151. After the ambient light passing through the second optical lens 151 is received by the second optical sensor 152, the second image is acquired by the second optical sensor 152. Moreover, both of the second optical lens 151 and the second optical sensor 152 are arranged in a second optical axis A2 of the second optical module 15. Moreover, a curvy surface of the second optical lens 151 far from the second optical sensor 152 has a second reflective structure 153 to reflect the ambient light. By the second reflective structure 153, the ambient light introduced into the second optical lens 151 is reflected to the second optical sensor 152.

Please refer to FIGS. 1, 2 and 3 again. The second optical lens 151 and the second optical sensor 152 are also arranged along the long axis L of the portable electronic device 1. Due to the arrangement of the second reflective structure 153, the orientation of a second viewing angle θ2 of the second optical module 15 is opposed to the orientation of the display screen 12 of the portable electronic device 1. That is, the second optical axis A2 of the second optical module 15 is also non-linear, i.e., the second optical axis A2 is not in a straight line. Preferably, an anti-reflective coating is formed on the surface of the second optical lens 151 where the ambient light passes through. Consequently, the ability of the ambient light to pass through the second optical lens 151 is enhanced.

The third optical module 16 comprises plural third optical lenses 161 and a third optical sensor 162. The plural third optical lenses 161 are fixed between the first optical lens 141 and the second optical lens 151 for allowing the ambient light to pass through. The third optical sensor 162 corresponds to the plural third optical lenses 161. After the ambient light passing through the plural third optical lenses 161 is received by the third optical sensor 162, the third image is acquired by the third optical sensor 162. Moreover, all of the plural third optical lenses 161 and the third optical sensor 162 are arranged in third optical axis A3 of the third optical module 16. The plural third optical lenses 161 and the third optical sensor 162 are also arranged along the long axis L of the portable electronic device 1. That is, the third optical axis A3 of the third optical module 16 is linear. As shown in FIGS. 1, 2 and 3, the third optical axis A3 is perpendicular to a periphery surface 111 of the periphery region 11 of the portable electronic device 1. Moreover, a third viewing angle θ3 of the third optical module 15 is oriented along the long axis L of the portable electronic device 1.

Preferably but not exclusively, the first optical lens 141 and the second optical lens 151 are integrally formed with each other, and the plural third optical lenses 161 are fixed in the region between the first optical lens 141 and the second optical lens 151. In another embodiment, the first optical lens, the second optical lens and the plural third optical lenses are integrally formed with each other.

As shown in FIG. 3, the control unit 17 is connected with the first optical sensor 142, the second optical sensor 152 and the third optical sensor 162. After the first image and the second image are captured, the first image and the second image are combined as a panoramic image by the control unit 17. In this embodiment, the first optical sensor 142, the second optical sensor 152 and the third optical sensor 162 are integrated with each other. This example is presented herein for purpose of illustration and description only. In another embodiment, the first optical sensor, the second optical sensor and the third optical sensor are separate components.

As shown in FIG. 1, the camera casing 13 has a rectangular shape. Moreover, a first surface 131, a second surface 132 and a third surface 133 of the camera casing 13 are flat surfaces. The first surface 131 of the camera casing 13 is on the same side as the front surface of the display screen 12 of the portable electronic device 1. The second surface 132 of the camera casing 13 is on the same side as the rear surface of the display screen 12. The third surface 133 of the camera casing 13 is on the same side as the periphery surface 111 of the periphery region 11. This example is presented herein for purpose of illustration and description only. In another embodiment, any of the first surface, the second surface and the third surface of the camera casing is a curvy surface.

The operations of the optical apparatus 10 will be illustrated in more details as follows. When the user intends to operate the portable electronic device 1 to capture a panoramic image of an object (not shown), the portable electronic device 1 is held by hands of the user while the display screen 12 faces the user. Consequently, the first optical module 14 faces the user, the second optical module 15 faces the front side of the user (or the object in the front side of the user), and the third optical module 16 faces the top side of the user (i.e., the direction perpendicular to the first optical module 14 and the second optical module 15). As shown in FIG. 2, the portable electronic device 1 is in the usage status.

When the user performs an image capturing operation by pressing a capture button or triggering a capture interface, a portion of the ambient light is introduced into the first optical module 14 and reflected by the first reflective structure 143. After the reflected ambient light passes through the first optical lens 141, the ambient light is transmitted to the first optical sensor 142. Consequently, the first image is acquired. The first image contains the scene of the user.

Similarly, another portion of the ambient light is introduced into the second optical module 15 and reflected by the second reflective structure 153. After the reflected ambient light passes through the second optical lens 151, the ambient light is transmitted to the second optical sensor 152. Consequently, the second image is acquired. The second image contains the scene of the object.

Then, the first image and the second image are combined as the panoramic image by the control unit 17 according to an image stitching technology. The panoramic image contains the scene of the user and the scene of the object.

The following four aspects should be specially described.

Firstly, during the process of producing the panoramic image, only the first optical module 14 and the second optical module 15 are used, but the third optical module 16 is not used. Since first viewing angle θ1 of the first optical module 14 and the second viewing angle θ2 of the second optical module 15 are wider, the wide-angle images are captured by the first optical module 14 and the second optical module 15. Under this circumstance, it is not necessary to use the third optical module 16. It is noted that numerous modifications and alterations may be made while retaining the teachings of the invention. For example, in another embodiment, the third optical module is used for sensing the ambient light. If the first viewing angle θ1 and the second viewing angle θ2 are not wide enough, the third image is captured by the third optical module 16. After the first image, the second image and the third image are captured, these images are combined as a panoramic image by the control unit 17.

Secondly, the ambient light contains the light beams in a first wavelength range, the light beams in a second wavelength range and/or the light beams in a thermal band. For example, the light beams in the first wavelength range are visible light beams, the light beams in the second wavelength range are invisible light beams, and the light beams in the thermal band are the light beams from a thermal source.

Thirdly, the third optical module 16 in the above embodiment is used for capturing images. It is noted that the function of the third optical module 16 is not restricted. For example, in another embodiment, the third optical module is used for sensing the ambient light. Under this circumstance, the third optical sensor of the third optical module is an optical sensor for sensing the ambient light.

Fourthly, the optical apparatus 10 is installed on a periphery region 11 of the portable electronic device 1. That is, the optical apparatus 10 is a part of the portable electronic device 1. This example is presented herein for purpose of illustration and description only. In some other embodiments, the optical apparatus is installed on an extension position that is extended from the periphery region. Under this circumstance, the optical apparatus is not a part of the portable electronic device, but the optical apparatus is combined with the portable electronic device.

Figure 4:
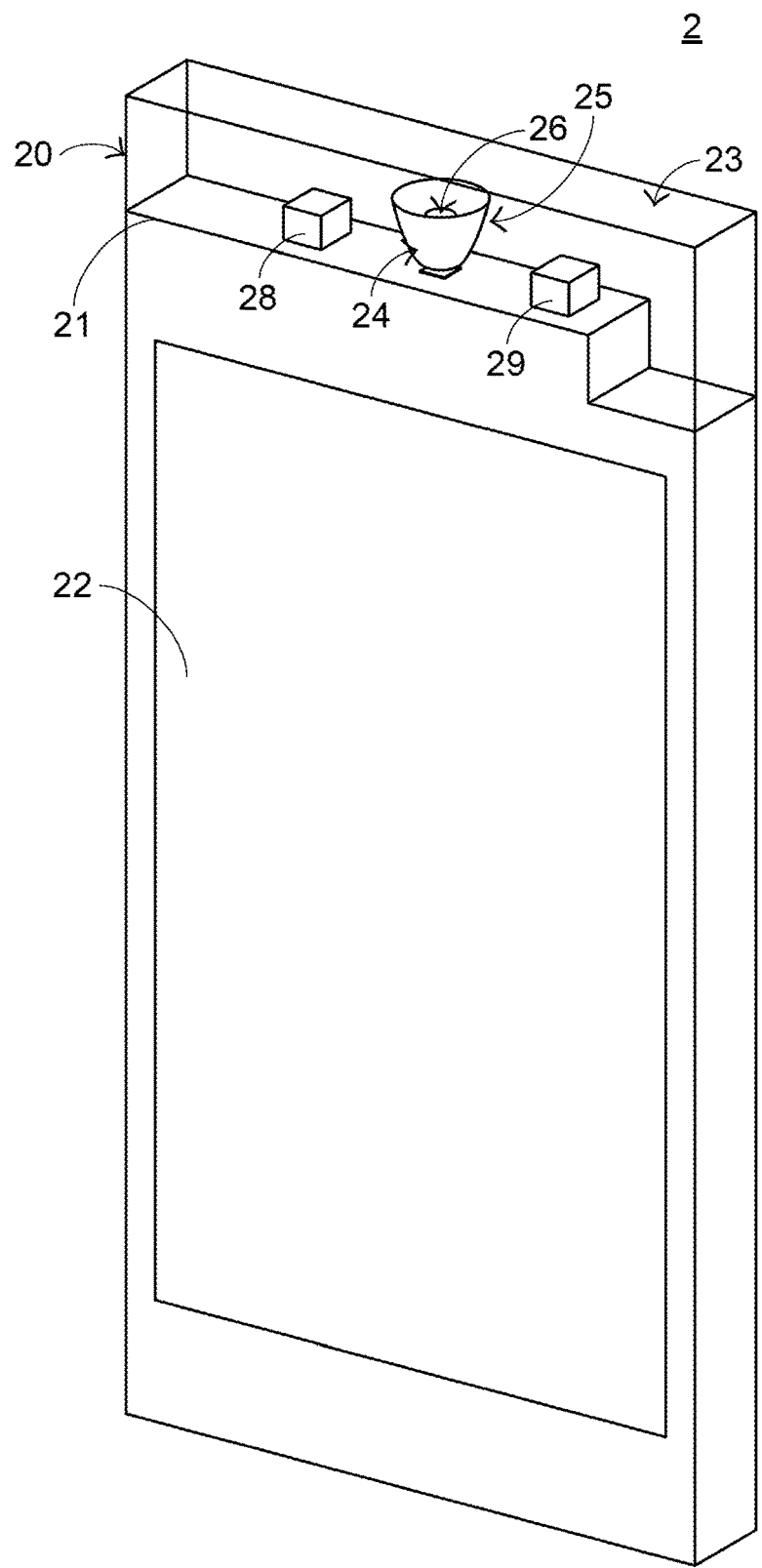
FIG. 4 is a schematic perspective view illustrating an optical apparatus and a portable electronic device according to a second embodiment of the present invention.

The present invention further provides an optical apparatus of a second embodiment, which is distinguished from the first embodiment. FIG. 4 is a schematic perspective view illustrating an optical apparatus and a portable electronic device according to a second embodiment of the present invention. The optical apparatus 20 is installed on a periphery region 21 of the portable electronic device 2. The periphery region 21 is extended externally from a nearby position of a display screen 22 of the portable electronic device 2. In this embodiment, the optical apparatus 20 comprises a camera casing 23, a first optical module 24, a second optical module 25, a third optical module 26, a control unit (not shown), a first time-of-flight (TOF) measuring device 28 and a second time-of-flight measuring device 29. The components of the optical apparatus 20 of this embodiment that are similar to those of the optical apparatus 10 of the first embodiment are not redundantly described herein. The following two aspects are distinguished. Firstly, the camera casing 23 of the optical apparatus 20 of this embodiment is L-shaped. Secondly, the optical apparatus 20 of this embodiment further comprises the first time-of-flight measuring device 28 and the second time-of-flight measuring device 29.

The structures and functions of the first time-of-flight measuring device 28 and the second time-of-flight measuring device 29 will be described as follows. The first time-of-flight measuring device 28 is installed on the camera casing 23. Moreover, the first time-of-flight measuring device 28 corresponds to the first optical module 24. The second time-of-flight measuring device 29 is installed on the camera casing 23, and arranged beside first time-of-flight measuring device 28. Moreover, the second time-of-flight measuring device 29 corresponds to the second optical module 25. The first time-of-flight measuring device 28 and the second time-of-flight measuring device 29 are collaboratively used to measure the distance of the panoramic image. Consequently, the function of the optical apparatus 20 is enhanced. This example is presented herein for purpose of illustration and description only. In another embodiment, the optical apparatus is equipped with a single time-of-flight measuring device corresponding to the third optical module. The time-of-flight measuring device is used to measure the distance of the object that is captured by the third optical module.

Figure 5:
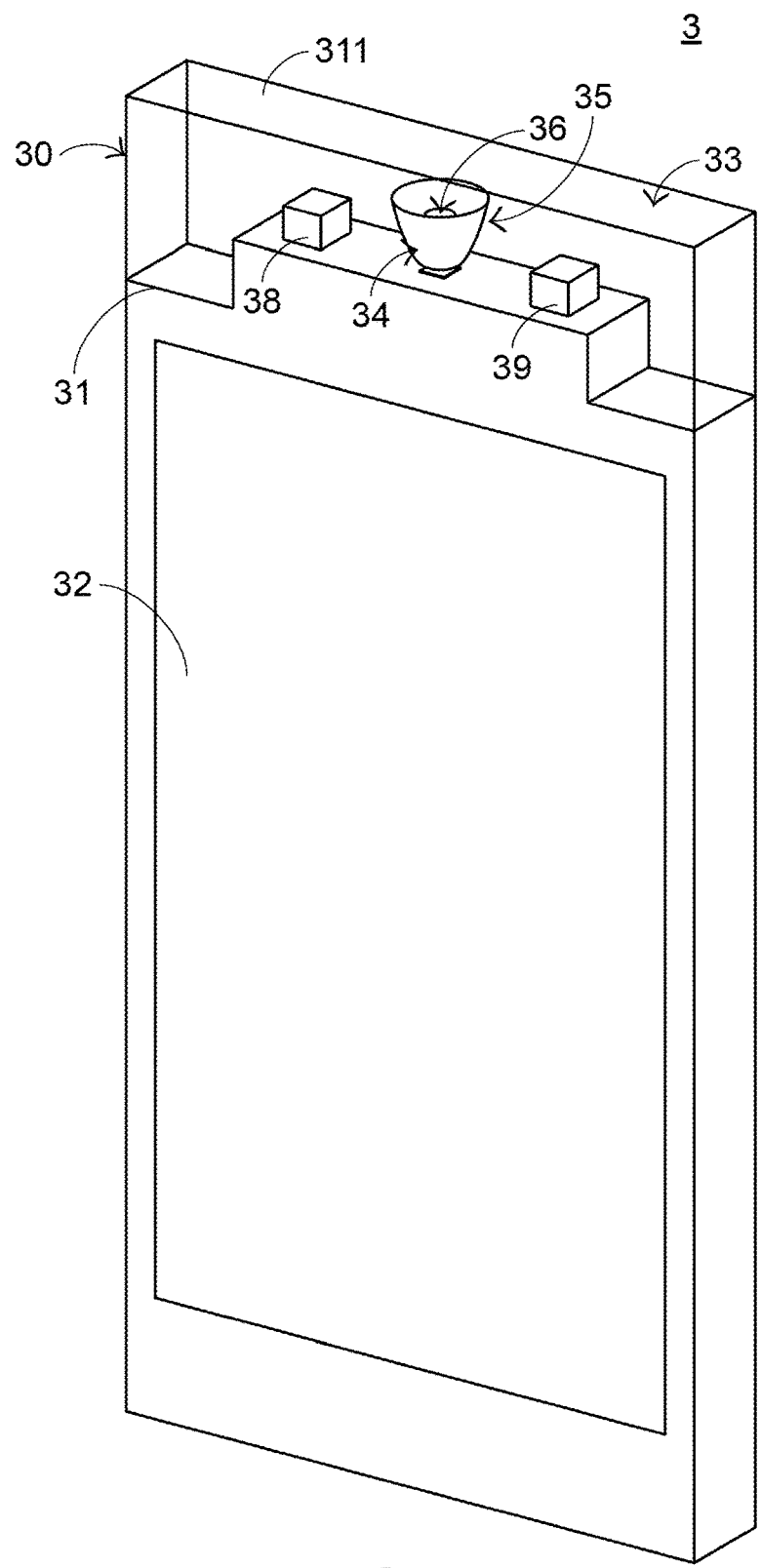
FIG. 5 is a schematic perspective view illustrating an optical apparatus and a portable electronic device according to a third embodiment of the present invention.

The present invention further provides an optical apparatus of a third embodiment, which is distinguished from the above embodiments. FIG. 5 is a schematic perspective view illustrating an optical apparatus and a portable electronic device according to a third embodiment of the present invention. The optical apparatus 30 is installed on a periphery region 31 of the portable electronic device 3. The periphery region 31 is extended externally from a nearby position of a display screen 32 of the portable electronic device 3. In this embodiment, the optical apparatus 30 comprises a camera casing 33, a first optical module 34, a second optical module 35, a third optical module 36, a control unit (not shown), a first structured light generation device 38 and a second structured light generation device 39. The components of the optical apparatus 30 of this embodiment that are similar to those of the optical apparatus 10 of the first embodiment are not redundantly described herein. The following two aspects are distinguished. Firstly, the camera casing 33 of the optical apparatus 30 of this embodiment is n-shaped. Secondly, the optical apparatus 30 of this embodiment further comprises the first structured light generation device 38 and the second structured light generation device 39.

The first structured light generation device 38 is installed on the camera casing 33 and connected with the control unit. The first structured light generation device 38 is used for generating a first structured light pattern. In an embodiment, the first structured light generation device 38 comprises a light source, an optical element group with a projection pattern and a conversion lens module. The light source emits plural light beams. After the plural light beams pass through the projection pattern of the optical element group, the plural light beams are transmitted through the conversion lens module. After the plural light beams are collimated and expanded by the conversion lens module, the plural light beams are projected on a projection surface such as a projection screen. Consequently, a first structured light pattern is formed on the projection surface. The structure of the second structured light generation device 39 is similar to that of the first structured light generation device 38. The second structured light generation device 39 is used for projecting a second structured light pattern on the projection surface. The projecting directions of the plural light beams from the first structured light generation device 38 and the second structured light generation device 39 are perpendicular to a periphery surface 311 of the periphery region 31 of the portable electronic device 3.

Moreover, the control unit can control the first structured light generation device 38 and the second structured light generation device 39 to output plural light beams at the same time or at different times according to a time sequence. Consequently, the first structured light pattern, the second structured light pattern and an overlapped pattern of the first structured light pattern and the second structured light pattern can be produced at different time points.

Figure 6:
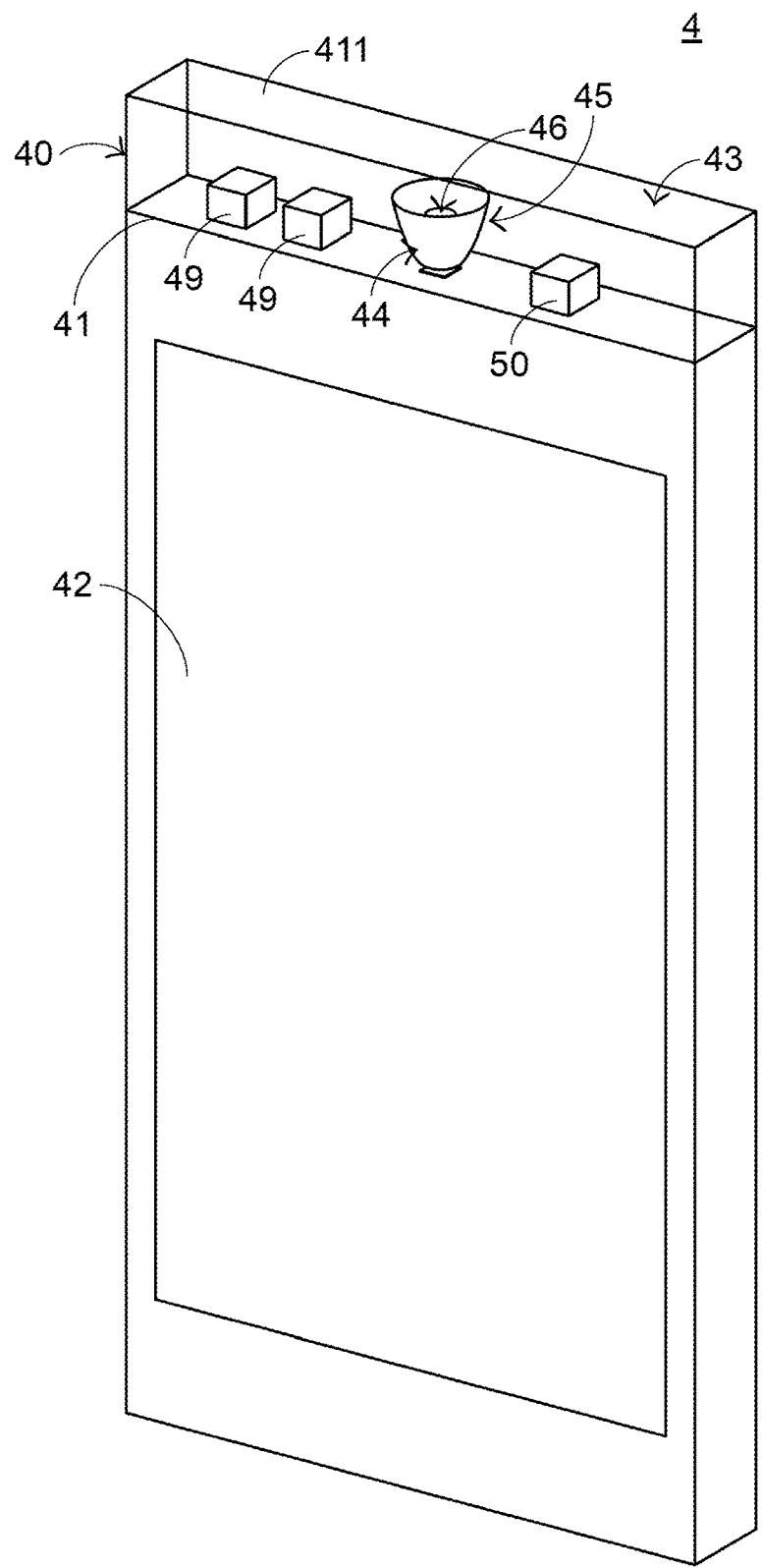
FIG. 6 is a schematic perspective view illustrating an optical apparatus and a portable electronic device according to a fourth embodiment of the present invention.

The present invention further provides an optical apparatus of a fourth embodiment, which is distinguished from the above embodiments. FIG. 6 is a schematic perspective view illustrating an optical apparatus and a portable electronic device according to a fourth embodiment of the present invention. The optical apparatus 40 is installed on a periphery region 41 of the portable electronic device 4. The periphery region 41 is extended externally from a nearby position of a display screen 42 of the portable electronic device 4. In this embodiment, the optical apparatus 30 comprises a camera casing 43, a first optical module 44, a second optical module 45, a third optical module 46, a control unit (not shown), a projection device 48, a structured light generation device 49 and a time-of-flight measuring device 50. The components of the optical apparatus 40 of this embodiment that are similar to those of the optical apparatus 10 of the first embodiment are not redundantly described herein. The following two aspects are distinguished. In comparison with the optical apparatus 10 of the first embodiment, the optical apparatus 40 of this embodiment further comprises the projection device 48, the structured light generation device 49 and the time-of-flight measuring device 50.

The projection device 48 is installed on the camera casing 43. In an embodiment, the projection device 48 comprises a light source, a display element and an optical lens. The light source emits plural light beams After the plural light beams pass through the display element, a displaying image is shown on display element. After the plural light beams pass through the optical lens, the displaying image is projected on a projection surface. The projecting directions of the plural light beams are perpendicular to a periphery surface 411 of the periphery region 41 of the portable electronic device 4. The functions of the structured light generation device 49 and the time-of-flight measuring device 50 are similar to those of the above embodiments, and are not redundantly described herein. Consequently, the functions of the optical apparatus 40 are enhanced.

Figure 7:
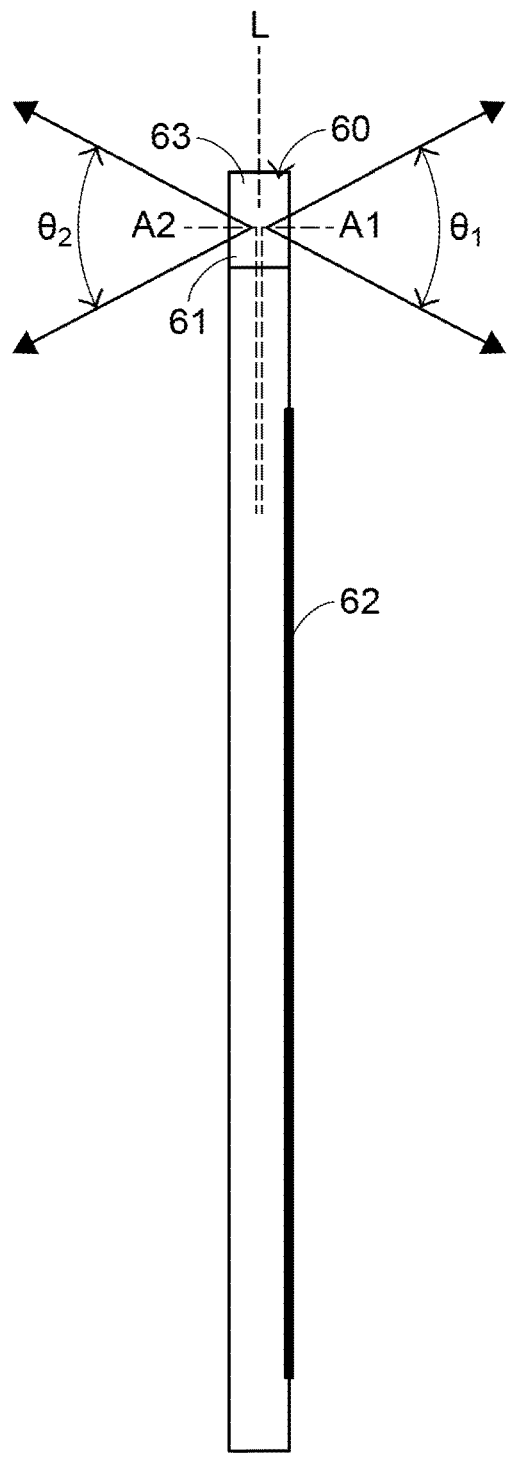
FIG. 7 is a schematic side view illustrating an optical apparatus and a portable electronic device according to a fifth embodiment of the present invention.
Figure 8A:
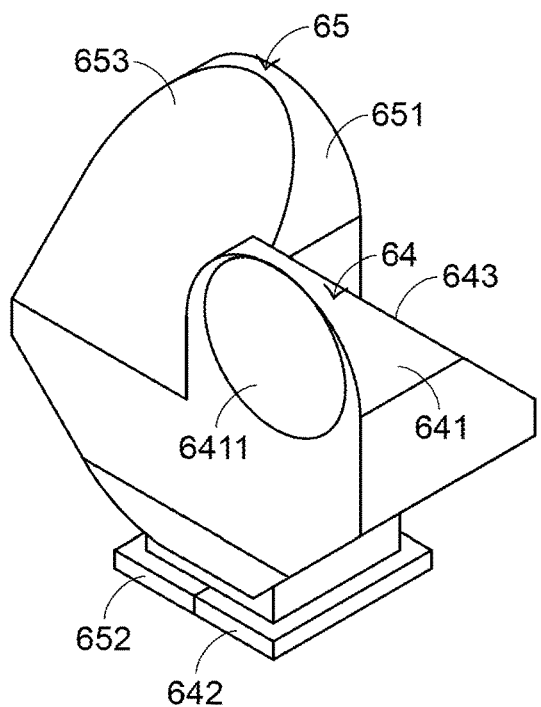
FIGS. 8A and 8B are schematic perspective views illustrating the optical apparatus according to the fifth embodiment of the present invention and taken along different viewpoints.
Figure 8B:
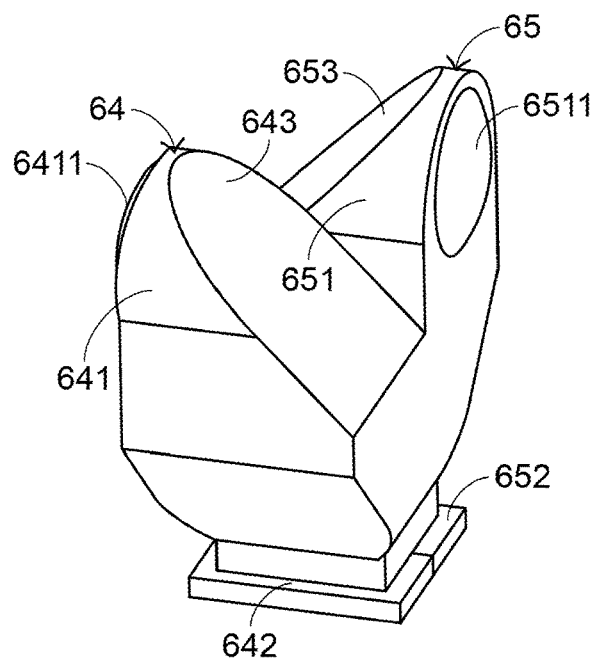

The present invention further provides an optical apparatus of a fifth embodiment, which is distinguished from the above embodiments. FIG. 7 is a schematic side view illustrating an optical apparatus and a portable electronic device according to a fifth embodiment of the present invention. FIGS. 8A and 8B are schematic perspective views illustrating the optical apparatus according to the fifth embodiment of the present invention and taken along different viewpoints. The optical apparatus 60 is installed on a periphery region 61 of the portable electronic device 6. The periphery region 61 is extended externally from a nearby position of a display screen 62 of the portable electronic device 6. In this embodiment, the optical apparatus 60 comprises a camera casing 63, a first optical module 64, a second optical module 65 and a control unit (not shown). The components of the optical apparatus 60 of this embodiment that are similar to those of the optical apparatus 10 of the first embodiment are not redundantly described herein. In comparison with the first embodiment, the structures of the first optical module 64 and the second optical module 65 are distinguished.

The detailed structures of the first optical module 64 and the second optical module 65 are shown in FIGS. 8A and 8B. The first optical module 64 comprises a first optical lens 641, a first optical sensor 642 and a first reflective structure 643. The orientation of a first light-inputting surface 6411 of the first optical lens 641 is the same as the orientation of a display screen 62 of the portable electronic device 6. The first reflective structure 643 is located at a backside of the first light-inputting surface 6411 to reflect the ambient light. The first optical sensor 642 is arranged along a long axis L of the portable electronic device 6. Due to the arrangement of the first reflective structure 643, the orientation of a first viewing angle θ1 of the first optical module 64 is the same as the orientation of the display screen 62 of the portable electronic device 6. That is, the first optical axis A1 of the first optical module 44 is non-linear. Preferably, an anti-reflective coating is formed on the first light-inputting surface 6411 of the first optical lens 641. Consequently, the ability of the ambient light to pass through the first optical lens 641 is enhanced.

The second optical module 65 comprises a second optical lens 651, a second optical sensor 652 and a second reflective structure 653. The orientation of a second light-inputting surface 6511 of the second optical lens 651 is opposed to the orientation of the display screen 62 of the portable electronic device 6. The second reflective structure 653 is located at a backside of the second light-inputting surface 6511 to reflect the ambient light. The second optical sensor 652 is arranged along a long axis L of the portable electronic device 6. Due to the arrangement of the second reflective structure 653, the orientation of a first viewing angle θ2 of the second optical module 65 is opposed to the orientation of the display screen 62 of the portable electronic device 6. That is, the second optical axis A2 of the second optical module 65 is non-linear. Preferably, an anti-reflective coating is formed on the second light-inputting surface 6511 of the second optical lens 651. Consequently, the ability of the ambient light to pass through the second optical lens 651 is enhanced.

In this embodiment, the first optical lens 641 and the second optical lens 651 are integrated with each other, and the first optical sensor 642 and the second optical sensor 652 are integrated with each other. This example is presented herein for purpose of illustration and description only. In another embodiment, the first optical lens and the second optical lens are separate components, and the first optical sensor and the second optical sensor are separate components. Alternatively, the optical apparatus 60 is further equipped with a structured light generation device, a time-of-flight measuring device and a projection device. Consequently, the functions of the optical apparatus 60 are enhanced.

From the descriptions, the present invention provides an optical apparatus. The optical apparatus is installed on a periphery region of a portable electronic device. The periphery region is extended externally from a nearby position of a display screen of the portable electronic device. That is, the optical apparatus is additionally installed on the portable electronic device. Consequently, the optical apparatus provides a sufficient space to accommodate a first optical module, a second optical module and a third optical module. If necessary, the optical apparatus is further equipped with a structured light generation device, a time-of-flight measuring device and a projection device. The installation of these components is not restricted by the thickness of the portable electronic device. Consequently, the functions of the optical apparatus of the present invention are enhanced. In some situations, a zoom lens module requiring a larger space is disposed within the optical apparatus. Moreover, two of the first optical module, the second optical module and the third optical module have non-linear optical axes in order to replace the front camera module and the rear camera module of the conventional panoramic camera.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An optical apparatus installed on a periphery region of a portable electronic device or an extension position extended from the periphery region, the optical apparatus comprising:
   a camera casing fixed on the periphery region of the portable electronic device;
   a first optical module installed on the camera casing, wherein the first optical module receives an ambient light to capture a first image;
   a second optical module installed on the camera casing and arranged beside the first optical module, wherein the second optical module receives the ambient light to capture a second image, or the second optical module senses the ambient light, wherein at least one of the first optical module and the second optical module has a non-linear optical axis;
   a structured light generation device installed on the camera casing, wherein the structured light generation device comprises:
      at least one light source emitting plural light beams;
      an optical element group with a projection pattern, wherein after the plural light beams pass through the projection pattern of the optical element group, a structured light is outputted; and
      a conversion lens module installed on the camera casing, wherein after the plural light beams are collimated and expanded by the conversion lens module, the plural light beams are projected on a projection surface, so that a structured light pattern is formed on the projection surface, wherein projecting directions of the plural light beams are perpendicular to a periphery surface of the periphery region of the portable electronic device; and
   a projection device installed on the camera casing, wherein the projection device comprises:
      at least one light source emitting plural light beams;
      a display element arranged beside the at least one light source, wherein after the plural light beams pass through the display element, a displaying image is shown on display element; and
      an optical lens installed on the camera casing, wherein after the plural light beams from the display element pass through the optical lens, the displaying image is projected on a projection surface, wherein projecting directions of the plural light beams are perpendicular to a periphery surface of the periphery region of the portable electronic device.

2. The optical apparatus according to claim 1, wherein a first optical axis of the first optical module is non-linear, and the first optical module comprises:
   a first optical lens fixed on the camera casing, and allowing the ambient light to pass through; and
   a first optical sensor corresponding to the first optical lens, wherein after the ambient light passing through the first optical lens is received by the first optical sensor, the first image is acquired by the first optical sensor,
   wherein the first optical lens has a first reflective structure to reflect the ambient light, wherein after the ambient light is reflected by the first reflective structure, the ambient is transmitted to the first optical sensor through the first optical lens.

3. The optical apparatus according to claim 2, wherein when the second optical module receives the ambient light to capture the second image, a second optical axis of the second optical module is non-linear, wherein the second optical module comprises:
   a second optical lens fixed on the camera casing, and allowing the ambient light to pass through; and
   a second optical sensor corresponding to the second optical lens, wherein after the ambient light passing through the second optical lens is received by the second optical sensor, the second image is acquired by the second optical sensor,
   wherein the second optical lens has a second reflective structure to reflect the ambient light, wherein after the ambient light is reflected by the second reflective structure, the ambient is transmitted to the second optical sensor through the second optical lens.

4. The optical apparatus according to claim 3, wherein the optical further comprises a control unit, and the control unit is connected with the first optical sensor and the second optical sensor, wherein the first image and the second image are combined as a panoramic image by the control unit.

5. The optical apparatus according to claim 4, wherein the optical apparatus further comprises:
   a first time-of-flight measuring device installed on the camera casing and corresponding to the first optical module; and
   a second time-of-flight measuring device installed on the camera casing, arranged beside first time-of-flight measuring device, and corresponding to the second optical module,
   wherein a distance of the panoramic image is measured by the first time-of-flight measuring device and the second time-of-flight measuring device collaboratively.

6. The optical apparatus according to claim 3, wherein the camera casing is made of glass material or plastic material, anti-reflective coatings are formed on the first optical lens and the second optical lens where the ambient light passes through, and the first reflective structure and the second reflective structure are high reflective coatings.

7. The optical apparatus according to claim 3, wherein the optical apparatus further comprises a third optical module, and the third optical module is arranged between the first optical module and the second optical module, wherein the third optical module receives the ambient light to capture a third image, or the third optical module senses the ambient light, and the third optical module comprises:
   at least one third optical lens fixed between the first optical lens and the second optical lens, and allowing the ambient light to pass through; and
   a third optical sensor corresponding to the at least one third optical lens, wherein after the ambient light passing through the at least one third optical lens is received by the third optical sensor, the third image is acquired by the third optical sensor,
   wherein a third optical axis of the third optical module is linear, and the third optical axis is perpendicular to a periphery surface of the periphery region of the portable electronic device.

8. The optical apparatus according to claim 1, wherein when the second optical module senses the ambient light, the second optical module comprises:
   at least one second optical lens fixed on the camera casing, and allowing the ambient light to pass through; and
   a second optical sensor corresponding to the at least one second optical lens, wherein the ambient light passing through the at least one second optical lens is sensed by the second optical sensor, and a second optical axis of the second optical module is linear.

9. The optical apparatus according to claim 1, wherein the optical apparatus further comprises an additional structured light generation device, and the additional structured light generation device is installed on the camera casing to form an additional structured light pattern on the projection surface, wherein the structured light pattern and the additional structured light pattern are mixed as a mixed structured light pattern, and the mixed structured light pattern is correspondingly changed in response to a change of the structured light pattern or the additional structured light pattern.

10. The optical apparatus according to claim 1, wherein the optical apparatus further comprises a time-of-flight measuring device, and the time-of-flight measuring device is installed on the camera casing to measure a distance.

11. The optical apparatus according to claim 1, wherein the periphery region is extended externally from a nearby position of a display screen of the portable electronic device, and the optical apparatus is fixed on the periphery region through a mechanical mechanism, an electric mechanism and/or an electromagnetic mechanism.

12. The optical apparatus according to claim 1, wherein the camera casing is rectangular, L-shaped, n-shaped or asymmetric, and at least one of a first surface, a second surface and a third surface of the camera casing is flat or curvy.

13. The optical apparatus according to claim 1, wherein the ambient light contains light beams in a first wavelength range, light beams in a second wavelength range and/or light beams in a thermal band.

* * * * *